United States Patent [19]

Steffens, Jr.

[11] Patent Number: 5,507,521
[45] Date of Patent: Apr. 16, 1996

[54] AUTOMATIC TILT MECHANISM FOR STEERING WHEEL WITH INFLATABLE RESTRAINT

[75] Inventor: Charles E. Steffens, Jr., Washington, Mich.

[73] Assignee: TRW Vehicle Safety Systems Inc., Lyndhurst, Ohio

[21] Appl. No.: 394,602

[22] Filed: Feb. 27, 1995

[51] Int. Cl.[6] .............................. B60R 21/22; B62D 1/18; B62D 1/19
[52] U.S. Cl. .......................... 280/775; 280/777; 280/731; 74/493; 180/282
[58] Field of Search ...................... 280/777, 775, 280/731, 735, 734, 730.1; 74/493, 492; 180/274, 282, 280

[56] References Cited

U.S. PATENT DOCUMENTS

| | | |
|---|---|---|
| 3,481,626 | 12/1969 | Fergle . |
| 3,600,003 | 8/1971 | Carey . |
| 4,566,555 | 1/1986 | Schlanger . |
| 4,884,652 | 12/1989 | Vollmer . |
| 4,946,195 | 8/1990 | Ioka et al. . |
| 4,949,992 | 8/1990 | Abramczyk . |
| 4,968,058 | 11/1990 | Jones . |
| 5,026,092 | 6/1991 | Abramczyk . |
| 5,054,810 | 10/1991 | Backhaus et al. . |
| 5,082,311 | 1/1992 | Melotik . |
| 5,154,253 | 10/1992 | Vollmer . |
| 5,295,712 | 3/1994 | Omura ................................. 280/777 |
| 5,346,255 | 9/1994 | Schafer et al. ......................... 280/777 |

FOREIGN PATENT DOCUMENTS

| | | | |
|---|---|---|---|
| 4105821 | 8/1992 | Germany ............................... 280/731 |
| 3-176251 | 7/1991 | Japan ..................................... 280/731 |
| 4-113954 | 4/1992 | Japan ..................................... 280/735 |
| 5-105014 | 4/1993 | Japan ..................................... 280/731 |

*Primary Examiner*—Margaret A. Focarino
*Assistant Examiner*—Peter C. English
*Attorney, Agent, or Firm*—Tarolli, Sundheim, Covell, Tummino & Szabo

[57] ABSTRACT

An inflatable vehicle occupant restraint apparatus (26) and a steering wheel (22) are mounted on an upper portion (38) of a vehicle steering column (20). The upper portion (38) of the steering column (20) is supported for pivotal movement relative to a lower portion (40) of the steering column (20). A latch member (72) on the steering column (20) is moveable into and out of a locked condition. In its locked condition, the latch member (72) engages the upper and lower portions (38 and 40) of the steering column (20) with each other to block manual pivotal movement of the upper portion (38). An actuator (100) can pivot the upper portion (38) of the steering column (20) automatically when the latch member (72) is in the locked condition. The actuator (100) moves the latch member (72) relative to the lower portion (40) of the steering column (20) to pivot the upper portion (38) relative to the lower portion (40) when the actuator (100) is actuated. The actuator (100) is actuated in response to a vehicle condition indicative of a vehicle collision.

13 Claims, 3 Drawing Sheets

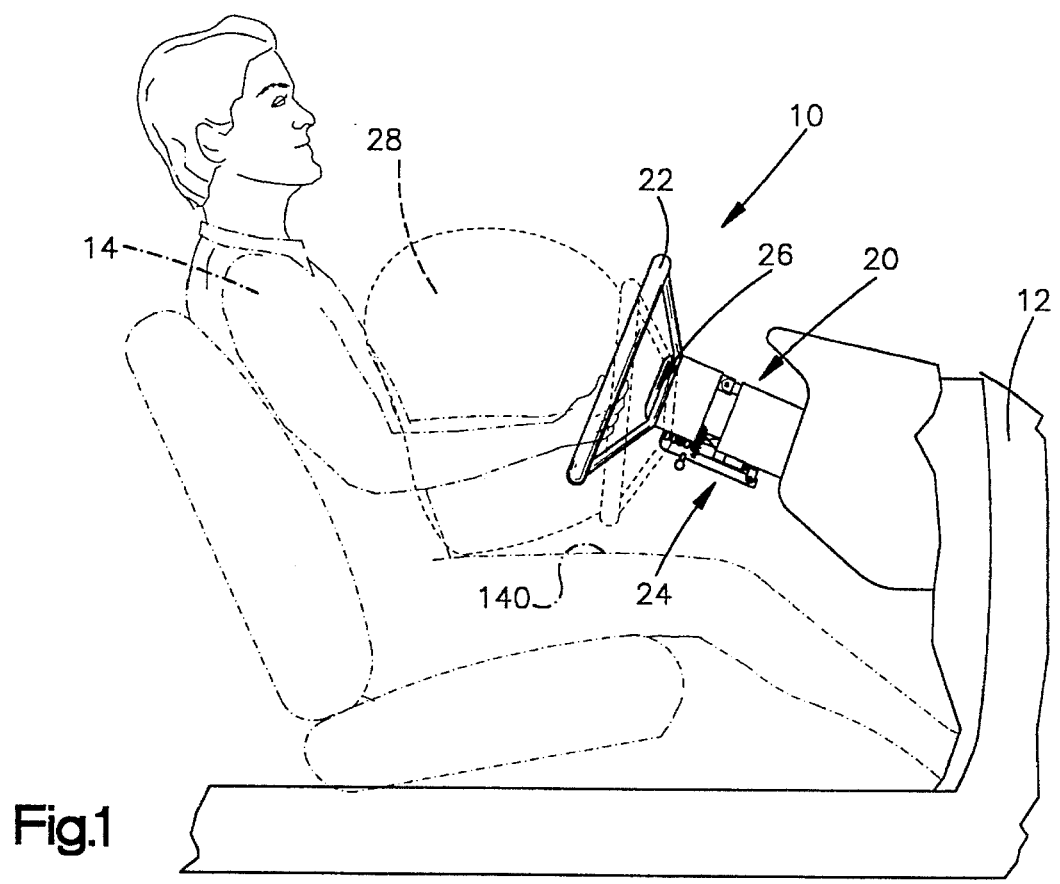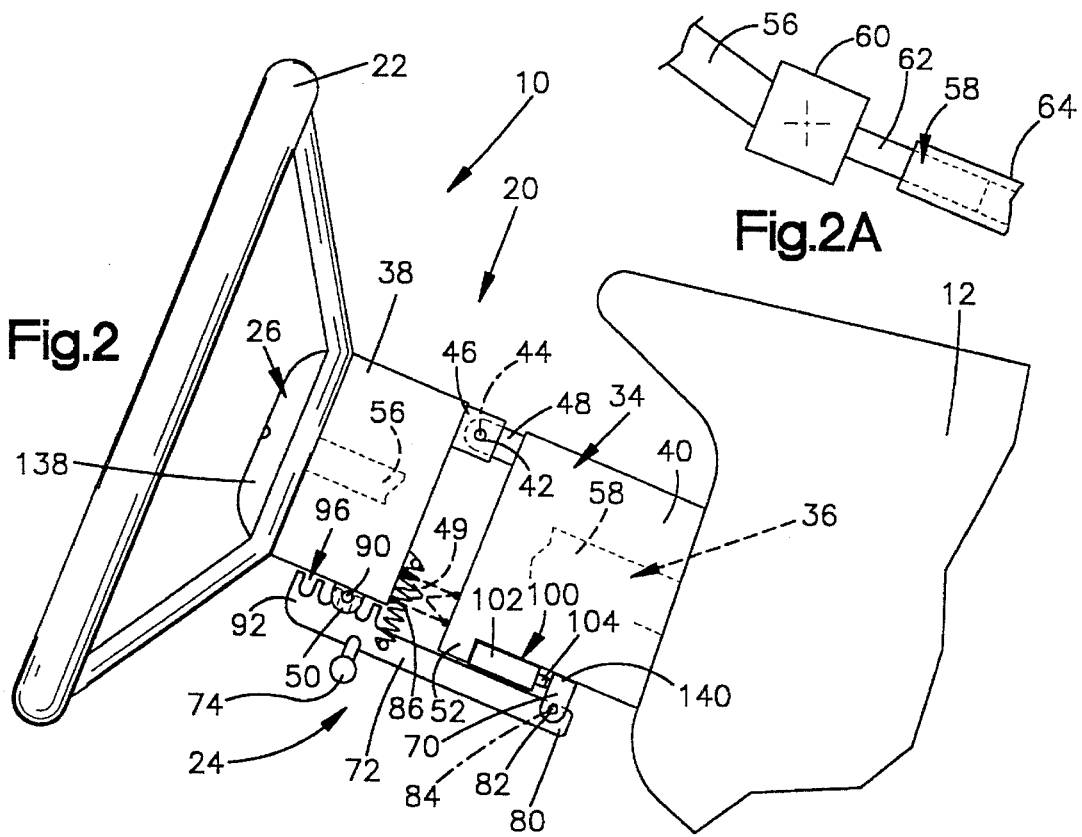

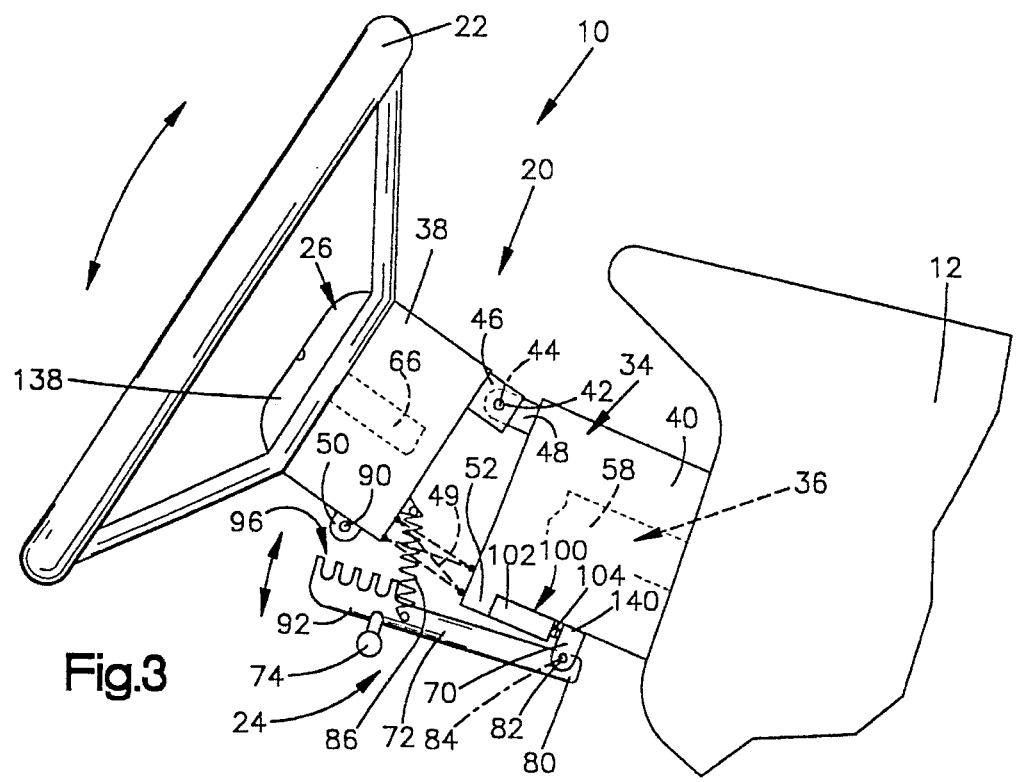
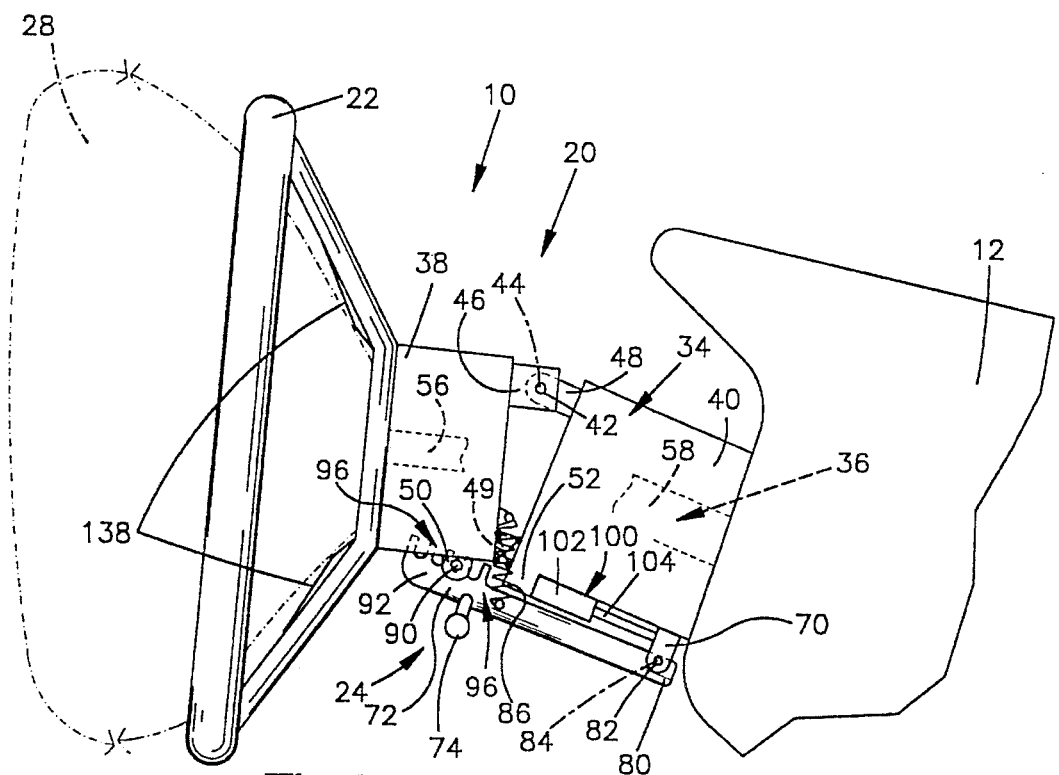

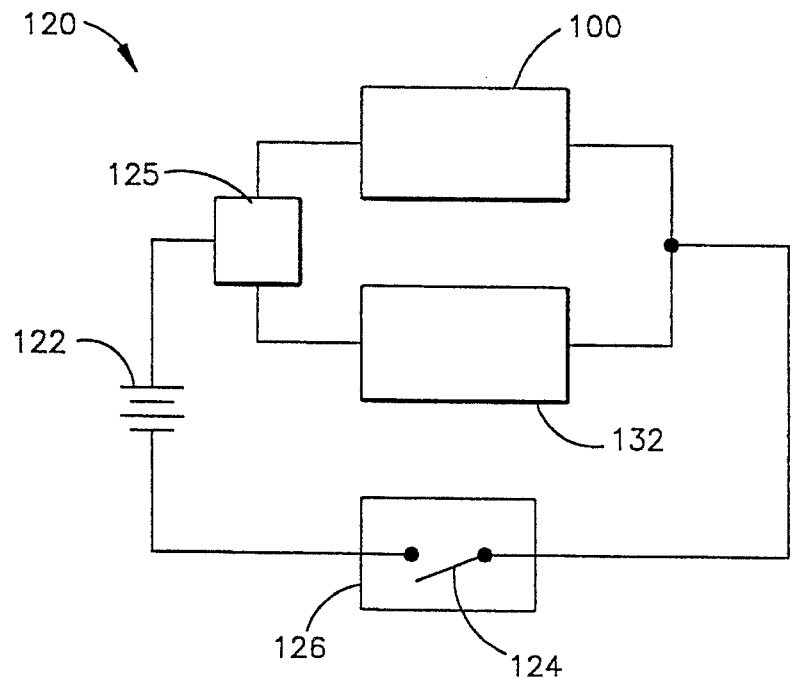
Fig. 5
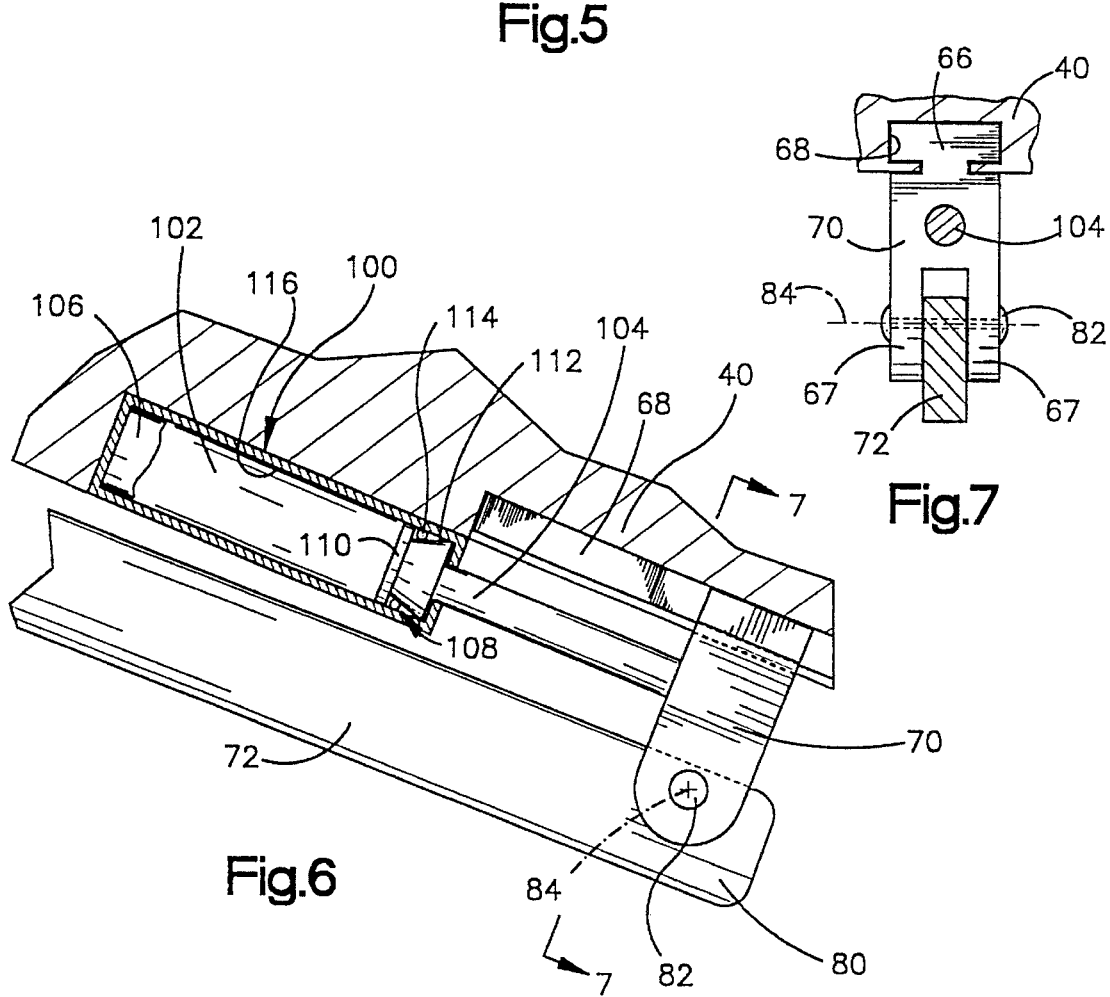
Fig. 6
Fig. 7

AUTOMATIC TILT MECHANISM FOR STEERING WHEEL WITH INFLATABLE RESTRAINT

FIELD OF THE INVENTION

The present invention relates to a steering wheel with an inflatable vehicle occupant restraint apparatus, and particularly relates to a mechanism for tilting the steering wheel and the restraint apparatus at the time of a vehicle collision.

BACKGROUND OF THE INVENTION

An inflatable vehicle occupant restraint, commonly referred to as an air bag, can be mounted on a vehicle steering wheel. The air bag is inflated between the vehicle operator and the steering wheel when the vehicle experiences a condition which indicates the occurrence of a vehicle collision. The collision-indicating condition may comprise, for example, a predetermined amount of vehicle deceleration. The inflated air bag protects the vehicle operator from a forceful impact with the steering wheel.

It is common to mount a vehicle steering wheel for pivotal movement to any one of several tilt angle positions. The steering wheel can be pivoted manually to a tilt angle position which is most comfortable for the vehicle operator.

SUMMARY OF THE INVENTION

In accordance with the present invention, an apparatus comprises a vehicle steering column, a vehicle steering wheel, and latch means. The steering column has an upper portion, a lower portion, and means for supporting the upper portion for pivotal movement relative to the lower portion. The steering wheel is mounted on the upper portion of the steering column for pivotal movement with the upper portion of the steering column.

The latch means includes a latch member which is movable into and out of a locked condition. The latch member engages the upper and lower portions of the steering column with each other to block the upper portion of the steering column from being pivoted manually when the latch member is in the locked condition.

The latch means further includes automatic means for pivoting the upper portion of the steering column automatically when the latch member is in the locked condition. The automatic means moves the latch member relative to the lower portion of the steering column to pivot the upper portion relative to the lower portion when the automatic means is actuated. The apparatus further comprises means for actuating the automatic means in response to a vehicle condition indicative of a vehicle collision above a predetermined threshold.

In a preferred embodiment of the present invention, the apparatus includes an inflatable vehicle occupant restraint which is mounted on the steering column. An inflator means inflates the inflatable restraint in response to the collision-indicating condition of the vehicle. In accordance with this feature of the present invention, the upper portion of the steering column and the inflatable restraint are both pivoted to a predetermined tilt angle position automatically in response to the collision-indicating condition. The predetermined tilt angle position corresponds to the lowest tilt angle position attainable by the upper portion of the steering column.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of an apparatus comprising a preferred embodiment of the present invention;

FIG. 2 is an enlarged view of the apparatus of FIG. 1;

FIG. 2A is a view of a portion of the apparatus not shown in FIG. 2 for clarity;

FIG. 3 is a view similar to FIG. 2 showing parts in other positions;

FIG. 4 is a view similar to FIG. 2 showing parts in yet other positions;

FIG. 5 is a schematic view of an electrical circuit including parts of the apparatus of FIG. 1;

FIG. 6 is an enlarged sectional view of a portion of the parts shown in FIG. 4; and FIG. 7 is a sectional view along line 7—7 in FIG. 6.

DESCRIPTION OF A PREFERRED EMBODIMENT

An apparatus 10 comprising a representative embodiment of the present invention is shown schematically in FIG. 1. The apparatus 10 comprises parts of a vehicle 12 which is operated by vehicle operator 14. Such parts include a steering column 20, a steering wheel 22 which is mounted on the steering column 20, and a steering wheel tilt mechanism 24. The apparatus 10 further comprises an air bag module 26 (FIG. 2) which is mounted on the steering column 20 near the center of the steering wheel 22. The air bag module 26 includes an air bag 28 (FIG. 1) which is inflatable to restrain the vehicle operator 14.

As shown in FIG. 2, the steering column 20 includes a column housing 34 and a rotatable steering shaft 36. The housing 34 includes an upper housing member 38 and a lower housing member 40. A pivot connector 42 connects the upper and lower housing members 38 and 40 to each other and guides the upper housing member 38 for pivotal movement about a generally horizontal axis 44. Specifically, the pivot connector 42 extends between a connection portion 46 located adjacent to a top side of the upper housing member 38 and a connection portion 48 located adjacent to a top side of the lower housing member 40, such that the upper housing member 38 is pivotally supported on the lower housing member 40. The pivot connector 42 may be any conventional pivot mechanism, such as a mechanism including pins, bearings or bushings. The steering wheel 22 is connected with the upper housing member 38 to pivot about the axis 44 with the upper housing member 38, as known in the art.

A tilt spring 49 extends between the upper and lower housing members 38 and 40, at a location adjacent to bottom sides of the housing members. The tilt spring 49 is a compression spring and biases the upper housing member 38 to pivot upward about the axis 44 (in the clockwise direction, as viewed in FIG. 2). The tilt spring 49 thus biases the upper housing member 38 toward a highest tilt angle position and counteracts the weight of the steering wheel 22 and the upper housing member 38.

The steering wheel 22 is rotatable by the vehicle operator 14 for steering the vehicle 12. The steering wheel 22 is connected to the steering shaft 36 for rotation with the steering shaft relative to the housing 34. The steering shaft 36 includes a first segment 56, a second segment 58, and a universal joint 60 (FIG. 2A). The first segment 56 is connected to the steering wheel 22 and extends through the upper housing member 38. The second segment 58 has interfitting splined parts 62 and 64 which extend through the lower housing member 40. The splined parts 62 and 64 are slidable relative to each other to permit variation of the length of the second segment 58.

The universal joint 60 connects the first and second segments 56 and 58 to each other and transmits rotational force between the two segments 56 and 58. Also, the universal joint 60 permits the first segment 56 to pivot relative to the second segment 58 when the upper housing member 38 and the steering wheel 22 are pivoted about the axis 44 relative to the lower housing member 40. The interfitting splined parts 62 and 64 of the second segment 58 accommodate a translational shift of the universal joint 60 by an elongation of the second segment 58.

The tilt mechanism 24 (FIG. 2) has two functions. First, it is manually operable by the vehicle operator 14 for tilt angle adjustment of the steering wheel 22. Second, it operates automatically during a vehicle collision to move the steering wheel 22 and the air bag module 26 to a predetermined location. In the preferred embodiment of the present invention, the predetermined location is the lowest tilt angle position attainable. By way of example, the lowest tilt angle may correspond to the upper housing member 38 contacting the lower housing member 40.

The tilt mechanism 24 includes a connector 70, a latch 72, and a manually operable release lever 74. The connector 70 includes a T-shaped head 66 (FIG. 7) and two downwardly extending legs 67. The head 66 is located within a congruently shaped channel 68 in the lower housing member 40. The head 66 is slidable along the channel 68 but is not removable from the channel in a transverse direction (i.e., downward as shown in FIGS. 6 and 7).

The latch 72 (FIG. 2) is an elongated part which extends longitudinally from the lower housing member 40 to the upper housing member 38. A lower end portion 80 of the latch 72 is mounted between the legs 67 (FIG. 7) of the connector 70 by a pin 82 such that the latch 72 can pivot about an axis 84 relative to the connector 70. The latch 72 is thus pivotable between a locked condition, as shown in FIG. 2, and a released condition, as shown in FIG. 3. A latch spring 86 extends between the housing 34 and the latch 72 and biases the latch 72 to pivot upward toward the locked condition. The latch 72 is pivotable downward from the locked condition to the released condition against the bias of the latch spring 86 by the release lever 74 upon manual operation of the release lever 74 by the vehicle operator 14 (FIG. 1).

A mount portion 50 (FIG. 2) of the upper housing member 38 is located on a downward facing side of the upper housing member 38. An engagement pin 90 is fixed to the mount portion 50. An upper end portion 92 of the latch 72 is movable toward and away from the engagement pin 90 upon pivoting of the latch 72 about the axis 84. The upper end portion 92 of the latch 72 has a plurality of adjustment recesses 96 which face toward the upper housing member 38 and which can receive the engagement pin 90 when the latch 72 pivots to the locked condition. The latch 72 is releasably held in the locked condition by the latch spring 86.

When the latch 72 is in the locked condition (FIG. 2), the engagement pin 90 is located in one of the adjustment recesses 96 in the latch 72. The upper housing member 38 and the steering wheel 22 are then held in one of several different tilt angle positions. When the latch 72 is in the released condition (FIG. 3), the engagement pin 90 is not located in one of the adjustment recesses 96. The upper housing member 38 and the steering wheel 22 can then be pivoted about the axis 44 to a different tilt angle position.

If the vehicle operator 14 wishes to adjust the tilt angle position of the steering wheel 22, the vehicle operator 14 operates the release lever 74 manually to move the latch 72 from the locked condition to the released condition. The vehicle operator 14 can then pivot the steering wheel 22 manually about the axis 44 to a different tilt angle position. After adjusting the steering wheel 22, the vehicle operator 14 lets go of the release lever 74 to permit the latch spring 86 to pivot the latch 72 back to the locked condition. The latch 72 then re-engages the engagement pin 90 in one of the adjustment recesses 96. The steering wheel 22 is then held at the desired tilt angle position by the latch 72. Tilt control mechanisms which provides the first (manual) function of the tilt mechanism 24 are known in the art.

An actuator 100 is provided to move the latch 72 along the steering column 20 and to pivot the steering wheel 22 during automatic operation of the tilt mechanism 24. The actuator 100 is a pyrotechnic actuator including a cylinder 102, a piston 104, and a pyrotechnic charge 106 (shown in FIG. 6, after firing). A tilt mechanism mount 52 is located on a downward facing side of the lower housing member 40 at the end of the lower housing member 40 adjacent to the upper housing member 38. The cylinder 102 is fixed to the tilt mechanism mount 52. The connector 70 is fixed to the piston 104. The piston 104 is slidable relative to the cylinder 102 along the lower housing member 40. Sliding the piston 104 along the lower housing member 40 in a direction away from the tilt mechanism mount 52 increases the overall length of the pyrotechnic actuator 100. Such movement of the piston 104 moves the connector 70 away from the tilt mechanism mount 52 along the lower housing and moves the latch 72 along the lower housing member 40.

The pyrotechnic charge 106 is located within the cylinder 102 and includes an ignitable material (not shown), which produces gas when ignited, and a resistance wire or the like (not shown), which receives an electrical current to ignite the ignitable material. The ignitable material can have any suitable composition known in the art. The gas produced upon combustion of the ignitable material is trapped within the cylinder 102, and the pressure of the gas forces the piston 104 to slide relative to the cylinder 102 away from the tilt mechanism mount 52. The cylinder 102 and the piston 104 are sufficiently sealed to maintain the trapped gas pressure for a desired length of time to restrain movement of the piston 104 and the connector 70 in a reverse direction. In a preferred embodiment, the pressure is maintained for at least 100 ms. Of course, any other suitable structure could be used in place of the pyrotechnic charge 106 to move the piston 104, such as an electro-mechanical device or a compressed gas source.

The actuator 100 has an anti-reverse locking mechanism 108 which is located on a head 110 (FIG. 6) of the piston 104. In a preferred embodiment of the locking mechanism 108, the head 110 has an annular sloped surface 112 which defines a waist on the head 110. The sloped surface 112 tapers radially inwardly along the head 110 in a direction toward the pyrotechnical charge 106. A plurality of lock balls 114 are entrapped in the waist of the piston head 110 between the sloped surface 112 and an inner surface 116 of the cylinder 102. The lock balls 114 are sized such that they can rest at a most recessed end of the waist on the piston head 110 without frictionally interfering with movement of the piston head 110 relative to the inner surface 116 of the cylinder 102. When they move away from the most recessed end, however, the lock balls 114 will frictionally wedge between the piston head 110 and cylinder 102.

When the piston 104 is moved under the influence of fluid pressure from the pyrotechnical charge 106 (toward the right in FIG. 6), the lock balls 114 travel with the piston head 110 and rest in the most recessed end of the waist. Once the piston 104 has completed this movement and some external force tends to move the piston 104 in a reverse direction (toward the left in FIG. 6), the lock balls 114 ride up the sloped surface 112 and wedge. Thus, a reverse movement of the piston 104 is prevented.

As shown schematically in FIG. 5, the actuator 100 is included in an electrical circuit 120. The electrical circuit 120 further includes a power source 122, which is preferably the vehicle battery and/or a capacitor, a normally open switch 124, and a timer 125. The switch 124 is preferably part of a collision sensor 126 which senses a vehicle condition indicative of a collision for which inflation of the air bag 28 is desired to restrain an occupant of the vehicle. The collision-indicating condition may comprise, for example, a predetermined amount of vehicle deceleration. The collision sensor 126 closes the switch 124 upon sensing such a collision-indicating condition. The timer 125 provides a means for delaying ignition after the closing of the switch 124.

When the switch 124 is closed, electric current passes through the timer 125 and through the resistance wire of the actuator 100. The resistance wire is then heated and ignites the ignitable material. The piston 104 is then moved out of the cylinder 102 as described above, and the connector 70 is moved with the piston 104 in a direction to the right, as viewed in FIG. 4. The latch 72 is thus moved with the connector 70 relative to the lower housing member 40 while it is in the locked condition.

When the latch 72 is moved with the piston 104 in the foregoing manner, the upper housing member 38 and the steering wheel 22 are pivoted about the axis 44. Specifically, as the latch 72 moves along the lower housing member 40 in a direction to the right, as viewed in FIG. 4, the latch 72 pulls on the pin 90 to pivot the upper housing member 38 downward.

In addition to the air bag 28, the air bag module 26 further includes an electrically actuatable inflator 132, which is shown schematically in FIG. 5. The inflator 132 comprises a source of inflation fluid for inflating the air bag 28, and is connected to the power source 122 and the switch 124 through the timer 125. The inflator 132 is actuated when the switch 124 in the collision sensor 126 is closed and electric current passes through the timer 125 to the inflator 132. The inflator 132 is thus actuated upon the occurrence of a vehicle collision for which inflation of the air bag 28 is desired to restrain the vehicle operator 14. For example, the inflator 132 is actuated when the vehicle experiences deceleration above a predetermined threshold. When the inflator 132 is actuated, it provides a large volume of inflation fluid which is directed into the air bag 28 to inflate the air bag 28. The inflator 132 and the actuator 100 may be both actuated at the same time or the timing can be varied with the timer 125 to fire the actuator 100 at a different time than the inflator 132. In a preferred embodiment, the difference in time is less than a typical air bag deployment time. Also in the preferred embodiment, the actuator 100 is actuated prior to the inflator 132.

As the inflation fluid from the inflator 14 begins to inflate the air bag 28, it moves the air bag 28 forcefully against a cover 138 which covers and conceals the air bag 28 in the module 26. The cover 138 is then ruptured by the stress induced by the pressure of the inflation fluid in the air bag 28, and is moved out of the path of the air bag 28 as the air bag 28 emerges from the module 26. The air bag 28 is thus inflated into a position in which it extends from the vehicle steering column 20 toward the torso of the vehicle operator 14 to restrain movement of the vehicle operator 14 toward the steering column 20, as shown in FIGS. 1 and 4.

As described above, the actuator 100 is actuated when the switch 124 in the collision sensor 126 is closed. The actuator 100 is thus actuated simultaneously, or nearly simultaneously, with the inflator 132. As a result, the steering wheel 22 is automatically moved downward, approximately when the air bag 28 is being inflated. This ensures that the air bag 28 will engage the torso of the vehicle operator 14 to utilize properly the restraining and energy absorbing capability of the air bag 28. In accordance with a preferred embodiment of the present invention, the tilt angle position to which the steering wheel 22 is moved is the lowest tilt angle position attainable by the tilt mechanism 24. This lowest tilt angle position is when the upper housing member 38 contacts, or nearly contacts, the lower housing member 40. However, also in accordance with the preferred embodiment, should there be a blockage such as the upper portion 140 (FIG. 1) of the leg of the vehicle operator 14 blocking the tilt path of the steering wheel 22, the steering wheel 22 will only travel to the point of contact resistance with the blockage. The actuator 100 and its components, are sized such that the contact resistance will overcome the power of the actuator 100 and prevent further movement of the steering wheel 22.

This application at various places discusses pivoting of the steering wheel and inflation of an air bag in response to a vehicle condition indicative of a vehicle collision. It should be obvious to one skilled in the art that the pivoting of the steering wheel and inflation of the air bag will occur only if the vehicle collision is of a sufficient severity to make pivoting of the steering wheel and inflation of the air bag desirable. Such will not occur if the vehicle encounters a minor impact. Thus, in this specification where reference is made to pivoting the steering wheel and inflating an air bag in response to a vehicle condition indicative of a vehicle collision, it should be understood that the vehicle collision must be of sufficient severity.

From the above description of the invention, those skilled in the art will perceive improvements, changes and modifications. For example, the actuator 100 may be replaced by structure which pulls the connector 70 and the latch 72. Also, other latching means could be used or the locations of the mechanisms could be reversed to place the actuator 100 and associated structure on the upper housing member 38. Such improvements, changes and modifications within the skill of the art are intended to be covered by the appended claims.

Having described the invention, the following is claimed:

1. Apparatus comprising:

a vehicle steering column having an upper portion, a lower portion, and means for supporting said upper portion for pivotal movement relative to said lower portion;

a vehicle steering wheel mounted on said upper portion of said steering column for pivotal movement with said upper portion of said steering column;

latch means including a latch member which is movable into and out of a locked condition, said latch member engaging said upper and lower portions of said steering column with each other to block said upper portion of said steering column from being pivoted manually when said latch member is in said locked condition;

said latch means further including automatic means for pivoting said upper portion of said steering column automatically when said latch member is in said locked condition, said automatic means moving said latch member relative to said lower portion of said steering column to pivot said upper portion relative to said lower portion when said automatic means is actuated;

means for actuating said automatic means in response to a vehicle condition indicative of a vehicle collision;

an inflatable vehicle occupant restraint mounted for movement with said vehicle steering wheel and inflator means for inflating said restraint in response to said vehicle condition; and timer means for causing activation of said automatic means and said inflator means at different times.

2. Apparatus as defined in claim 1 wherein said timer means causing activation of said automatic means prior to activation of said inflator means.

3. Apparatus comprising:

a vehicle steering column having an upper portion, a lower portion, and means for supporting said upper portion for pivotal movement relative to said lower portion;

a vehicle steering wheel mounted on said upper portion of said steering column for pivotal movement with said upper portion of said steering column;

latch means including a latch member which is movable into and out of a locked condition, said latch member engaging said upper and lower portions of said steering column with each other to block said upper portion of said steering column from being pivoted manually when said latch member is in said locked condition;

said latch means further including automatic means for pivoting said upper portion of said steering column automatically when said latch member is in said locked condition, said automatic means moving said latch member relative to said lower portion of said steering column to pivot said upper portion relative to said lower portion when said automatic means is actuated; and means for actuating said automatic means in response to a vehicle condition indicative of a vehicle collision;

said automatic means including an ignitable material which, when ignited, generates gas, a cylinder in which said gas is contained under pressure, a piston which is movable relative to said cylinder under the influence of the pressure of the gas, and means for connecting said piston with said latch member to move said latch member with said piston, said automatic means moving said latch member relative to said lower portion of said steering column under the influence of the pressure of said gas.

4. Apparatus comprising:

a vehicle steering column having an upper portion, a lower portion, and means for supporting said upper portion for pivotal movement relative to said lower portion;

a vehicle steering wheel mounted on said upper portion of said steering column for pivotal movement with said upper portion of said steering column;

latch means including a latch member which is movable into and out of a locked condition, said latch member engaging said upper and lower portions of said steering column with each other to block said upper portion of said steering column from being pivoted manually when said latch member is in said locked condition;

said latch means further including automatic means for pivoting said upper portion of said steering column automatically when said latch member is in said locked condition, said automatic means moving said latch member relative to said lower portion of said steering column to pivot said upper portion relative to said lower portion when said automatic means is actuated;

means for actuating said automatic means in response to a vehicle condition indicative of a vehicle collision; and means for maintaining said latch member in its locked condition during movement of said latch member by said automatic means.

5. Apparatus as defined in claim 4 further comprising an inflatable vehicle occupant restraint which is mounted for movement with said vehicle steering wheel and inflator means for inflating said restraint in response to said vehicle condition.

6. Apparatus as defined in claim 4 wherein said automatic means pivots said upper portion of said steering column to a predetermined tilt angle position, said automatic means further including means for holding said upper portion of said steering column securely in said predetermined tilt angle position.

7. Apparatus as defined in claim 6 wherein said means for holding said upper portion of said steering column securely in said predetermined tilt angle position includes means for holding said latch member relative to said lower portion of said steering column upon movement of said upper portion of said steering column to said predetermined tilt angle position.

8. Apparatus as defined in claim 4 wherein said automatic means includes an ignitable material which, when ignited, generates gas, said automatic means moving said latch member relative to said lower portion of said steering column under the influence of the pressure of said gas.

9. Apparatus as defined in claim 4 wherein said upper portion having a range of tilt angle positions relative to said lower portion, said automatic means pivoting said upper portion to a lowest tilt angle position in the range.

10. Apparatus as defined in claim 4 wherein said upper portion having a range of tilt angle positions relative to said lower portion, said automatic means pivoting said upper portion to a lower tilt angle position in the range.

11. Apparatus as defined in claim 10, wherein said lower tilt angle position corresponds to a position at which further pivoting is physically obstructed.

12. Apparatus comprising:

a vehicle steering column having an upper portion, a lower portion, and means for supporting said upper portion for pivotal movement relative to said lower portion;

a vehicle steering wheel mounted on said upper portion of said steering column for pivotal movement with said upper portion of said steering column;

latch means including a latch member which is movable into and out of a locked condition, said latch member engaging said upper and lower portions of said steering column with each other to block said upper portion of said steering column from being pivoted manually when said latch member is in said locked condition;

said latch means further including automatic means for pivoting said upper portion of said steering column automatically with said latch member in said locked condition, said automatic means moving said latch member relative to said lower portion of said steering column to pivot said upper portion relative to said lower portion when said automatic means is actuated;

means for actuating said automatic means in response to a vehicle condition indicative of a vehicle collision.

13. Apparatus as defined in claim 12, wherein said upper portion of said steering column has a plurality of adjustment positions, said steering column and said latch member have a set of segments which engage when said latch member is in the locked condition at each adjustment position of said upper portion of said steering column and which remain engaged during automatic pivoting of said upper portion of said steering column.

* * * * *